Patented Sept. 14, 1948

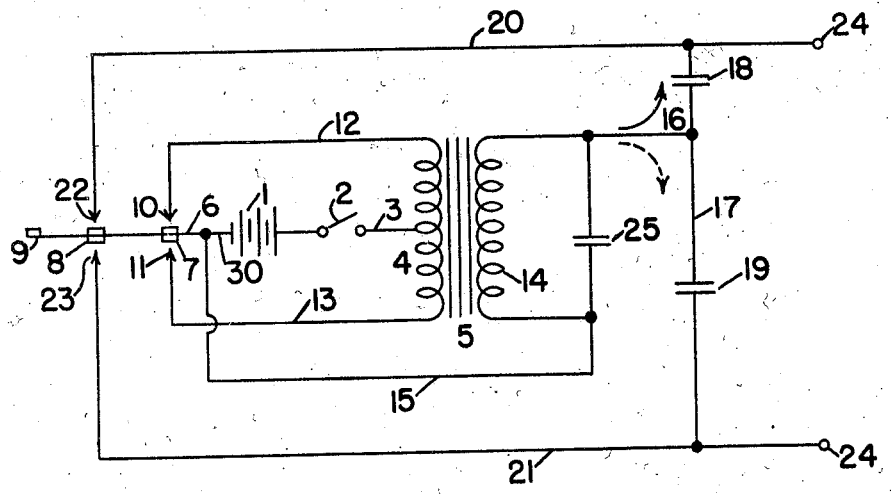
FIG. I
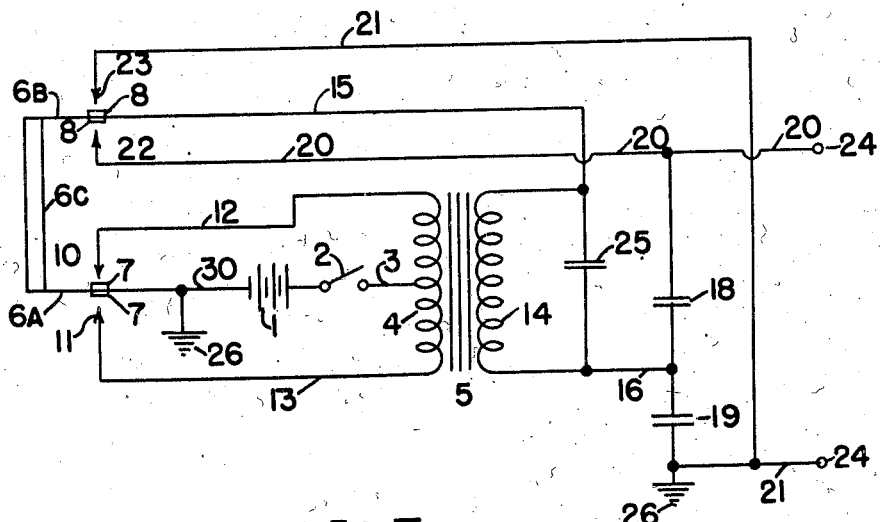
FIG. II
John R. Gelzer, Inventor
By Beaman & Patch

2,449,214

UNITED STATES PATENT OFFICE 2,449,214

VOLTAGE MULTIPLYING VIBRATOR APPARATUS

John R. Gelzer, Jackson, Mich., assignor to Eltron, Inc., Jackson, Mich., a corporation of Michigan Application May 1, 1948, Serial No. 24,661

5 Claims. (Cl. 171—97)

This invention relates to voltage multiplying vibrator apparatus employing a transformer and vibratory reed in association with an arrangement of contacts and a source of electrical energy adapted to develop and yield high D. C. voltages.

It is the object of the invention to provide a simple, compact and efficient form and arrangement of apparatus by which it is possible to develop very high voltages, in the order of several thousand volts, from very small and light weight dry cells or batteries.

The accompanying circuit diagrams illustrate two forms of the invention:

Fig. I being a circuit diagram of one form, and

Fig. II being a circuit diagram of an alternative and preferred form, utilizing a split vibrator reed.

Referring to the drawings, in which the same reference numerals have been employed to denote the same parts, the invention is shown applied to a conventional vibrator and transformer arrangement to provide a high voltage D. C. output with the elimination of high voltage rectifier elements. The circuit arrangement of Fig. I provides that all contacts on the vibrating reed structure are electrically connected to a common metallic support, whereas both circuits provide that the voltage peaks at critical points in the circuits are all lower than the output voltage.

In Fig. I the battery 1 connects through a switch 2 and lead line 3 to the midpoint of the primary winding 4 of a transformer 5. Another lead line 30 from the opposite pole of battery 1 couples the latter to the vibrating reed 6 of a vibrator assembly, the reed carrying a pair of longitudinally spaced electrical contacts 7 and 8 and an end counterbalance mass 9. Stationary contacts 10 and 11 on opposite sides of the reed contact 7 are coupled by lead lines 12 and 13 respectively to the opposite ends of the primary winding 4 of transformer 5. The vibratory motion of the reed 6 brings the contact 7 alternately in contact with the contacts 10 and 11. This results in the production of an alternating current in the primary winding of the transformer in a manner well known in the vibrator power supply field.

A high voltage will accordingly be produced in the secondary winding 14 of the transformer, the voltage depending upon the battery voltage and the ratio of the secondary turns to the primary turns. One end of the secondary transformer winding is coupled by a lead 15 to the reed 6 and the opposite end of this secondary winding is coupled by the lead 16 to the midpoint of a lead 17 incorporating two series connected condensers 18 and 19. Further leads 20 and 21 serve respectively to couple the condensers 18 and 19 to further vibrator contacts 22 and 23 and to the output terminals 24, as shown.

The operation of the circuit provides that during the period of time when the reed contacts 7 and 8 are touching the fixed contacts 10 and 22 a current will flow out of the transformer secondary 14 and will charge the condenser 18. During the alternate period of time when the reed contacts are touching the other fixed contacts 11 and 23 a like current will flow out of the transformer secondary 14 and will charge the other condenser 19. Due to the conventional action of the primary circuit arrangement these alternately flowing secondary currents will have the relative directions indicated by the arrows in Fig. I.

The result of these alternating currents is to produce or maintain charges in the condensers 18 and 19 approximating the crest value of the voltage produced in the transformer secondary 14. Since the output voltage is taken from these condensers in series, the output voltage will be twice the value across each condenser.

The condenser 25, shown connected across the transformer secondary 14, is provided for the purpose of reducing sparking due to the rapidly decaying flux in the transformer 5 at the instant the vibrator reed 6 breaks contact.

The circuit arrangement of Fig. II, as stated, is similar to that of Fig. I and differs therefrom only as to the construction of the vibrator reed, which is of split formation and comprises two arms 6a and 6b connected by an insulated bridge piece 6c. This arrangement possesses the advantage that the terminals may be grounded, as indicated at 26, both for the input (battery 1) and the output circuits.

Advantages of the circuit arrangements above described and provided in accordance with the invention are:

(1) By utilizing the storage action of two condensers the output voltage may be twice that obtainable with conventional vibrator circuits, (2) The one circuit arrangement i. e. Fig. I permits the use of a common metallic vibrator reed connection in both primary and secondary circuits. The other circuit arrangement i. e. Fig. II, on the other hand, has the advantage that it is possible to employ a terminal which is common to both the input and output, (3) For a given output voltage the insulation required at the contact points is only half that of conventional circuits, and (4) The voltage between transformer windings or between either winding and the core is not normally greater than half the output voltage.

By the use of these circuit arrangements it is possible to develop D. C. voltages in excess of 2,000 volts from a battery consisting of small dry cells, with the use of a very small vibrator and transformer assembly, and this without insulation break-down or destructive sparking at the contacts.

Having thus described the invention in two practical forms by way of example but without limitation to the precise details thereof (since these may be variously modified to suit particular requirements and practical considerations) what is claimed as novel and as constituting the scope of the required patent protection is as follows:

1. Electrical vibrator apparatus comprising in combination a transformer, a source of electrical energy, a vibrator element connected in circuit with the said source and one winding of the transformer and incorporating a plurality of electrical contacts, fixed electrical contacts corresponding to the said vibrator contacts and electrically connected with the transformer windings and storage condensers connected in circuit with said fixed contacts so as to be alternately charged for the alternate contact making positions of said vibrator element, the said storage condensers being so coupled that the output voltage is taken therefrom in series and is a multiple of the value across each condenser.

2. Electrical vibrator apparatus as claimed in claim 1 comprising a condenser connected across the transformer secondary winding, whereby to reduce sparking.

3. Electrical vibrator apparatus comprising in combination a transformer, a battery, a vibrator reed connected for actuation by said battery, the latter being in turn connected to the transformer primary winding and the said vibrator reed carrying electrical contacts, fixed contacts corresponding to said vibrator contacts and including contacts connected to the transformer primary, and other contacts connected to the output terminals, and a pair of storage condensers series connected between said output terminals, the transformer secondary being in turn connected to an intermediate point between said condensers and being also connected to the vibrator reed, whereby the output voltage taken from the condensers in series due to the alternate contact making positions of said vibrator reed is a multiple of the voltage value across each condenser.

4. An electrical multiplying voltage vibrator apparatus as claimed in claim 3 comprising a condenser connected across the transformer secondary so as to reduce sparking.

5. An electrical voltage multiplying vibrator apparatus as claimed in claim 3 comprising a split vibrator reed and common ground connections for both the input (battery) and output terminals.

JOHN R. GELZER.